Patented Jan. 9, 1923.

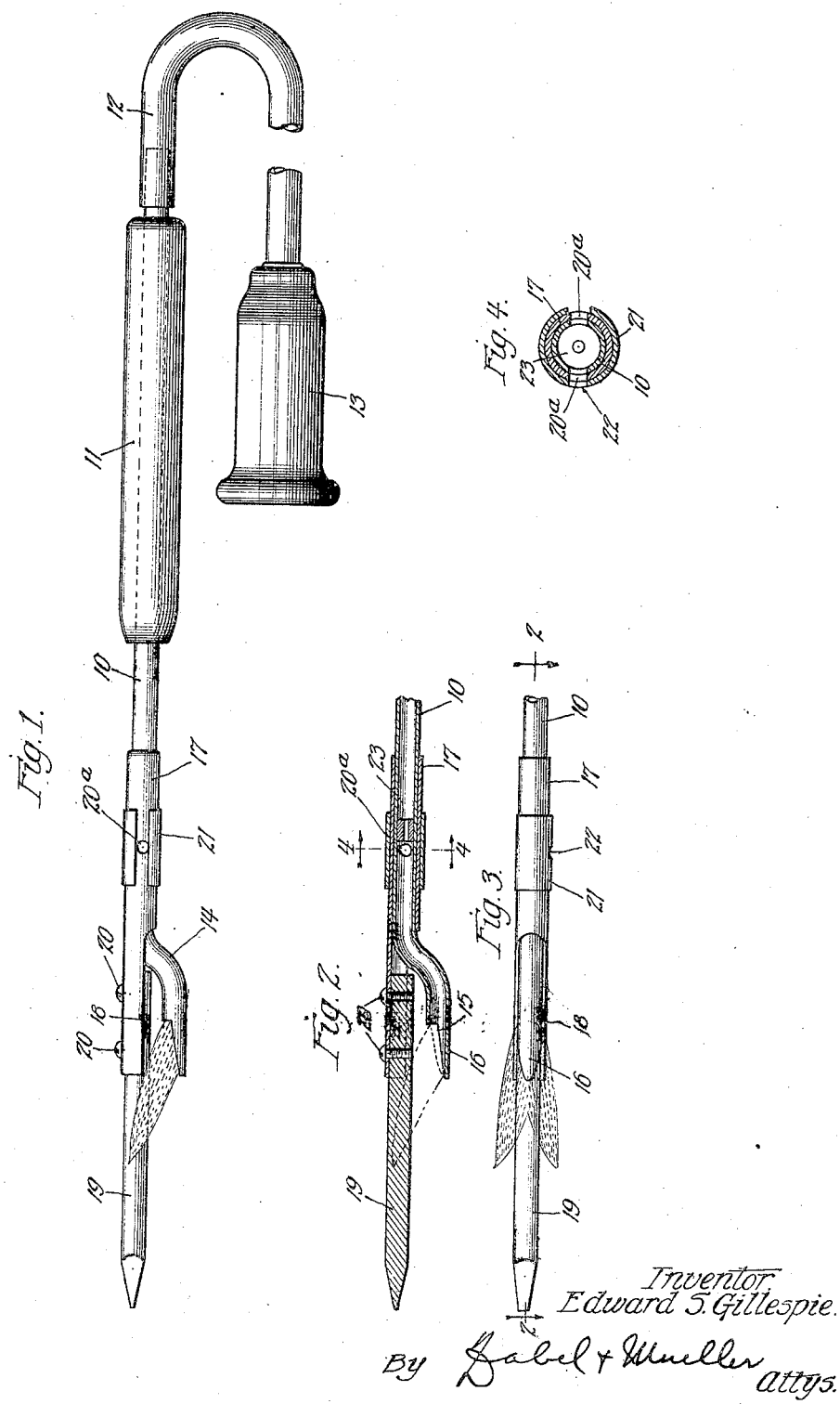

1,441,676

UNITED STATES PATENT OFFICE.

EDWARD S. GILLESPIE, OF CHICAGO, ILLINOIS, ASSIGNOR TO ASSOCIATED ENGINEERS CO., OF CHICAGO, ILLINOIS.

SOLDERING IRON.

Application filed October 27, 1920. Serial No. 419,941.

*To all whom it may concern:*

Be it known that I, EDWARD S. GILLESPIE, a citizen of the United States, residing at Chicago, in the county of Cook and State of Illinois, have invented a certain new and useful Improvement in Soldering Irons, of which the following is a full, clear, concise, and exact description, reference being had to the accompanying drawings, forming a part of this specification.

My invention relates to soldering irons and more particularly to irons of this character which are continuously heated during use by flame.

My invention has for its object the provision of an improved device of this character which shall be simple in construction and which shall be exceedingly light, the entire structure in one of its preferred forms weighing less than two ounces.

My invention further contemplates an improved structural arrangement which cheapens the cost of manufacture.

My invention further has for one of its prime objects, the provision of improved means for directing the flame against the soldering tip in such manner that when using a flame comparable in some respects to the Bunsen flame, a shield is introduced on one side of the gas cone which shield prevents the gases from being ignited on that side. For this reason, the gases will burn on the other side and forwardly of the gas cone. The flame, under these conditions, will be increased in volume on that particular side and will extend along the opposite sides of the soldering tip.

I will explain one form which my invention may take, more in detail by referring to the accompanying drawing in which—

Fig. 1 is a side view of a soldering iron constructed in accordance with my invention;

Fig. 2 is a sectional view on line 2—2 of Fig. 3;

Fig. 3 is a fragmentary side view at a 90° angle to the view of Fig. 1; and

Fig. 4 is a sectional view on line 4—4 of Fig. 2.

My improved device includes a tube 10 over which a handle 11 is driven so as to remain securely in place. The tube 10 at its right hand extremity engages a flexible tube 12 having the coupling 13 whereby the same may be attached to any suitable source of gas supply. The tube 10 has at its left hand extremity a compound curve as at 14 ending in an orifice 15. The extreme tip of the tube forms a deflector 16 which considerably overhangs the orifice 15. The tube 10 carries near its left hand extremity a shell 17 which shell or tube has a portion of its left hand extremity cut away as shown at 18, forming a trough within which the soldering tip 19 is mounted and held in place by means of the screws 20—20. The shell 17 is securely mounted upon the tube 10 as is readily apparent. A hole $20^a$ is drilled entirely through the opposite walls of the tube and shell 17 and the degree of opening of this hole is controlled by the adjustable split sleeve 21. This adjustable sleeve is slotted or split at one side as shown more clearly in Fig. 1 and has on its opposite side, a hole 22. Thus, when the sleeve is in the position shown in the illustrations, the holes $20^a$ in the opposite walls of the parts 10 and 17 are entirely open. The sleeve 21 is springy or resilient so that it remains in the position in which it is set. It may be rotated away from the position shown in the illustrations to more or less close the degree of opening permitted through the holes $20^a$. This regulates the air supply to the interior of the tube 10.

Now one of the main objects of the invention is to provide a structure of such a nature that the gas as supplied through the tube 10, is mixed with the air entering through the holes $20^a$ and that this gas when ignited, forms a flame at the orifice 15 which is directed against the tip 19 by the deflector 16.

While this structure in general may follow the broad lines of the Bunsen burner, yet the arrangement of the parts is such that instead of having the gases burning on all sides and forward of the gas cone, the gases are allowed to burn only on one side and forward of the gas cone. In this manner, I secure a high heating effect because of the concentration of the flame upon the soldering tip. This arrangement allows the burner to be fastened much closer to the soldering tip than if an ordinary burner were used, which burner would have to be placed at an angle to properly direct the flame against the soldering tip. This improved burner, therefore, has the advantage of forming a more compact and neater tool.

It will be noted that the structure is of extreme simplicity and that the various tubes, shells and sleeves together with the handle 11, fit easily together and are easily held in place. I thus secure the great advantage of having an extremely light structure for the soldering iron. In order to direct the flow of gas in accordance with the invention, I provide a plug 23 having a small hollow bore 24, which plug is forced into position within the tube 10 and which forms a sort of nozzle to direct the flow of the gas within the tube 10 and to give the gas sufficient velocity to draw air in through the holes 20$^a$, to mix with the gas.

From what has been thus described, it is thought the nature of my invention will be readily clear to those skilled in the art.

Having thus described one form which my invention may take, what I claim as new and desire to secure by U. S. Letters Patent is:

1. A device of the character described comprising a soldering tip, and means including air and fuel supply for directing a flame against said tip having a deflecting shield whereby the flame is directed at an angle to said tip.

2. A device of the character described comprising a soldering tip, a handle portion in axial alignment with said tip, and means for supplying air and fuel to said device said means terminating in an open ended tubular portion extending substantially parallel to said tip and closely adjacent thereto, said tubular portion terminating in a shield-like extension for throwing the flame against said tip.

3. A device of the character described comprising a tube having a handle formed thereon, means connected with one extremity of said tube for supplying fuel thereto, the opposite extremity of said tube being provided with an orifice, a shell carried by said tube, and a soldering tip carried by said shell in axial alignment with said tube, the end of said tube having said orifice being offset from the main portion thereof and extending parallel to said tip and closely adjacent thereto and having a shield formed at the end thereof for directing the flame against the soldering tip.

4. A device of the character described comprising a tube provided with a handle portion, means connected with one extremity of said tube for supplying fuel to the interior thereof, the opposite extremity of said tube having a portion offset parallel to the axis of said tube and having an orifice, a soldering tip secured to said tube in substantially axial alignment therewith, and a shield formed on the offset extremity of said tube for directing the flame against said soldering tip.

5. A device of the character described comprising a tube provided with a handle portion, means connected with one extremity of said tube for supplying fuel to the interior thereof, the opposite extremity of said tube having a portion offset parallel to the axis of said tube and having an orifice, a shell secured to said tube, a soldering tip secured to said shell in substantially axial alignment with said tube, and an elongated shield curved in cross section formed on the offset extremity of said tube for directing the flame against said soldering tip.

6. A device of the character described comprising a tube having a handle portion intermediate the length thereof, means connected with one extremity of said tube for supplying fuel to the interior thereof, the opposite extremity of said tube being offset parallel to the axis of said tube and having an orifice, a shell surrounding said tube, said shell having a cut away portion at one side thereof through which said offset extremity of said tube projects, a soldering tip mounted in said shell in axial alignment with said tube, and a shield formed on the extremity of said tube at one side of said orifice for directing the flame against said soldering tip.

In witness whereof, I hereunto subscribe my name this 19th day of October, A. D., 1920.

EDWARD S. GILLESPIE.